United States Patent

[11] 3,581,897

| [72] | Inventor | Walter C. Eggert<br>19060 11th Ave. Northwest, Seattle, Wash. 98177 |
|---|---|---|
| [21] | Appl. No. | 884,994 |
| [22] | Filed | Dec. 15, 1969 |
| [45] | Patented | June 1, 1971 |

[54] APPARATUS FOR THE PREVENTION OF AIR AND WATER POLLUTION IN THE MAKING OF WOODPULP FOR PAPER MAKING
10 Claims, 5 Drawing Figs.

| [52] | U.S. Cl. | 210/199, 210/203, 210/265 |
|---|---|---|
| [51] | Int. Cl. | B01d 21/02 |
| [50] | Field of Search | 210/199, 202, 203, 205, 265 |

[56] References Cited
UNITED STATES PATENTS

| 1,149,045 | 8/1915 | Greth et al. | 210/202 |
| 3,399,775 | 9/1968 | Ciaffone | 210/199X |

*Primary Examiner*—J. L. De Cesare
*Attorney*—Herman L. Gordon

ABSTRACT: Apparatus for treating the liquid containing residue chemicals from the processing of woodpulp. The apparatus consists of a duct leading to a series of water spray chambers through which the liquid is passed, being cooled and combining with the spray water. The resulting liquid is conducted into a covered receiving tank having a sloping bottom wall for collecting chemical sludge. The receiving tank has filter trays for filtering the liquid rising into the upper portion of the tank, with an overflow pipe at said upper portion for drawing off the filtered liquid. The tank has a lower drain conduit for draining off the chemical sludge to a separate collection point.

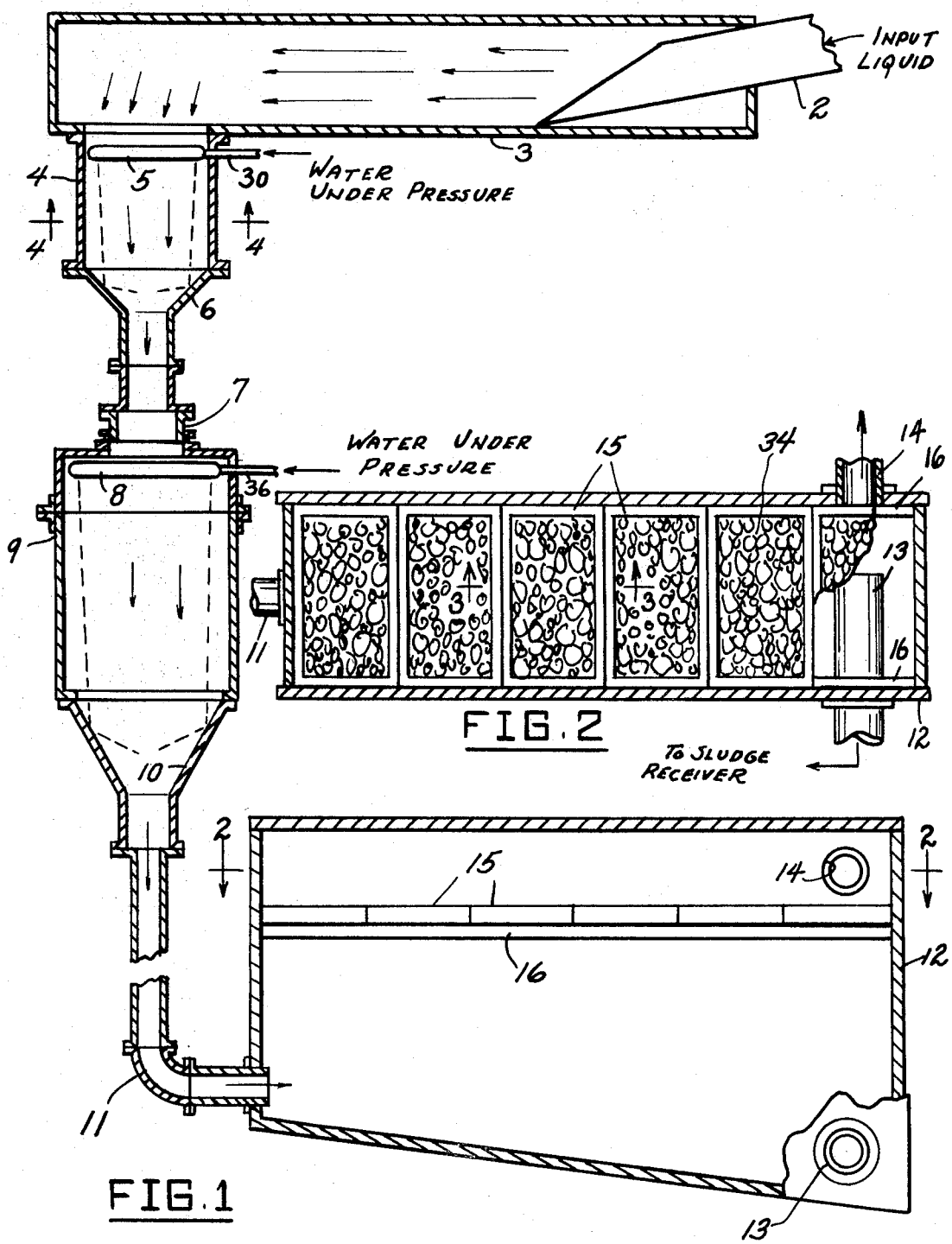

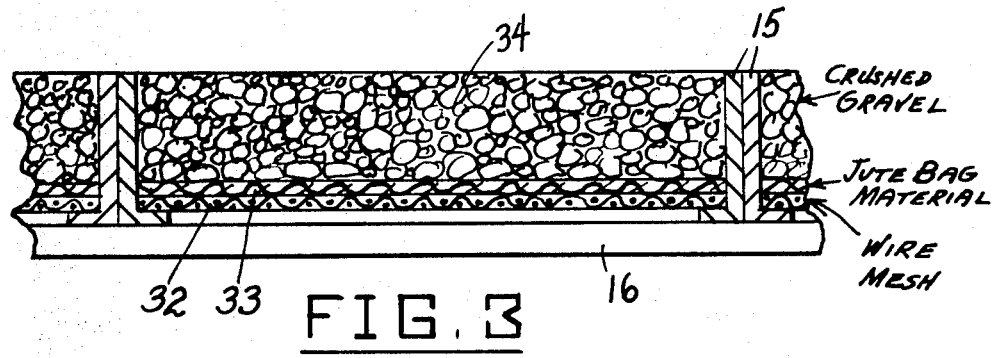
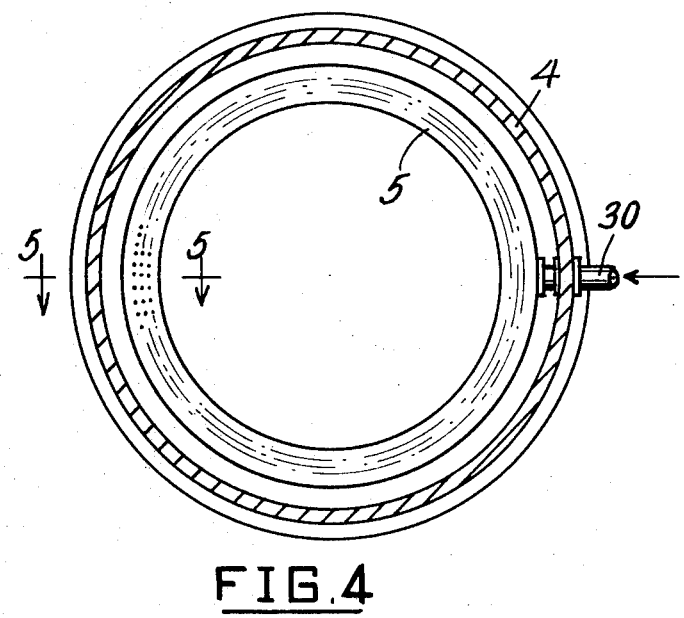
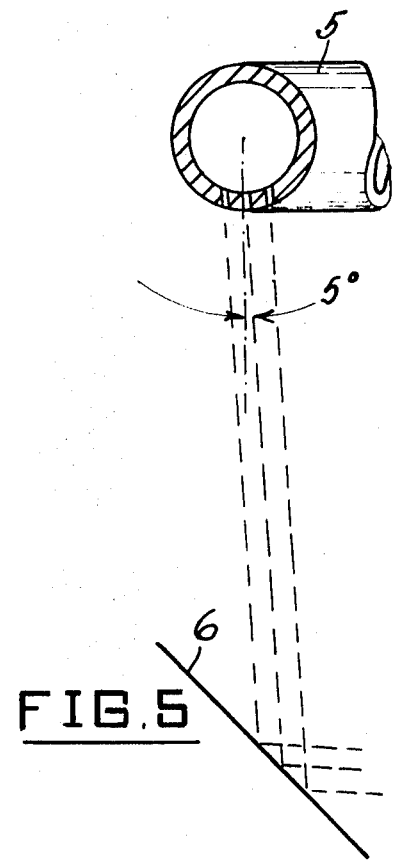
INVENTOR
WALTER C. EGGERT
BY Herman L. Gordon
ATTORNEY

APPARATUS FOR THE PREVENTION OF AIR AND WATER POLLUTION IN THE MAKING OF WOODPULP FOR PAPER MAKING

This invention relates to the treatment of water, chemical residue and bleaching chemicals that are used in manufacturing woodpulp, and also the recovery of other wood products from the liquid residue referred to as "black liquor," which is high in sulfur content, which is volatile and usable as fuel for the boilers to generate steam.

In the common paper-making process, the woodpulp is transferred throughout the entire processing circuit by pumping as woodpulp slurry, which contains 40 percent to 50 percent water, making the pulp slurry suitable for pumping. The woodpulp slurry, when prepared for use, is pumped to a station having a receiving box for dewatering the pulp. It is run over a suction screen, or other mechanical means, for dewatering.

The black liquor extracted from the woodpulp slurry is high in sulfur content and is used as fuel to generate steam from the boilers, together with residue oil, also having various degrees of sulfur content. The evaporation point of sulfurous material is about 800° F. Sulfurous gases have a strong affinity for hot water and steam. Admitting water into the smoke stack where the temperature is very high immediately generates steam at a high temperature. The sulfurous gases from the fuel oil and black liquor used for fuel to generate steam for power purposes and other uses have a strong affinity for the steam generated by the water containing residue chemicals admitted into the smokestack. By this procedure a large volume of hydrogen sulfide gas is generated, being emitted from the smokestack, thereby polluting the atmosphere over large areas. Also, the polluted vapor, or any water converted into steam, is expanded over 1,700 times its original volume. One cubic foot of water is expanded into 1,700 cubic feet of contaminating polluted gases ejected into the atmosphere through the smokestack.

Another disadvantage of admitting water into the smokestack is that it cools the stack gases and retards draft, preventing the stack gases from going higher into the atmosphere as they would normally do.

The main object of the present invention is to safely dispose of the water containing the residue chemicals that were used in the circuit in the making of woodpulp. According to the method utilized in the present invention, when the pulp is prepared for use, by being pumped to a station having a receiving box where the pulp is dewatered, the residue liquid is processed in a special manner to avoid the possibility of polluting the atmosphere.

A typical apparatus for achieving the objects of the present invention is illustrated in the accompanying drawings, wherein:

FIG. 1 is a vertical cross-sectional view taken through an apparatus according to the present invention.

FIG. 2 is a horizontal cross-sectional view taken substantially on the line 2-2 of FIG. 1.

FIG. 3 is an enlarged vertical cross-sectional detail view taken substantially on the line 3-3 of FIG. 2.

FIG. 4 is an enlarged horizontal cross-sectional view taken substantially on the line 4-4 of FIG. 1.

FIG. 5 is a further enlarged vertical cross-sectional view taken substantially on the line 5-5 of FIG. 4.

In accordance with the present invention, the residue liquid obtained when the woodpulp slurry is dewatered is directed to a launder 2, thence into a duct 3, and then into a tank 4. Tank 4 has a spray ring 5 fastened at the top inside tank 4. This spray has many small holes drilled about 5° toward the center of the tank. This sprays water under pressure downward inside tank 4 from a suitable water supply source connected to the spray ring through a nipple 30 shown attached to spray ring 5 and tank 4. The spray ring sprays the water downward, splashing the conical bottom 6 of tank 4, cooling the liquid from duct 3 and forcing it downward through an expansion joint 7. This action also causes a draw from duct 3 and a suction effect urging the water and residual liquid downwardly into a subjacent tank 9. Tank 9 has a spray ring 8 fastened on the inside top of tank 9, with many small holes in ring 8 drilled at an angle of about 4° toward the center of the tank. Spray ring 8 sprays downward, splashing on the conical bottom 10 of tank 9. Spray ring 8 increases the draw through duct 3 and also further cools the liquid in circuit. The liquid in the circuit is forced downward through a pipe 11 into a tank 12. Tank 12 has a sloping bottom. Pipe 13 is connected to tank 12 at its deepest point. Pipe 13 is for the purpose of drawing off the chemical sludge that will settle to the bottom of tank 12. Designated at 16 are support bars fastened to the front and rear walls of tank 12 to hold flat crates 15. The flat crates extend across tank 12, as well as from end to end of the tank, resting on the support bars 16. The flat crates have a steel screen 32 of about 3/16- inch mesh for a bottom. This steel screen is covered on the inside of the flat crates with jute bag material 33. The flat crates have end and sidepieces about 3 inches high. On top of the jute bag material 33, 3/16-inch crushed gravel 34 is placed to the height of the end and sidepieces of the flat crates 15. The flat crates 15 and their contents have a good filtering effect, thereby concentrating the chemical sludge. The chemical sludge settled in tank 12 is drawn out of tank 12 and piped into a private small pond containing 6 feet to 8 feet of earth sludge (soft mud).

Pipe 14 is for the continuous flow of water to overflow when it rises to the height of pipe 14. The constant flow of water that passes into the smokestack, under the prior procedure, varies from 300 to 450 tons of water per 24 hours, whereas, the procedure of the present invention does not permit any water to enter the smokestack.

Therefore, the above variable amount (300 to 450 tons) plus the spray water used through the spray rings 5 and 8 must enter tank 12 through pipe 11; the chemical sludge will concentrate and settle and will be drawn out only through pipe 13. The rest of the water goes through the flat crates 15, rises to the level of pipe 14, and is piped into a suitable large pond containing an earth sludge bottom, for further settling of chemical sludge, resulting in reasonably clean water, permitting the overflow from the second private pond to be employed for other uses of to be run off into other bodies of water.

What I claim is:

1. An apparatus for the treatment of the liquid residue including water, chemical residue and bleaching chemicals obtained from dewatering woodpulp in paper making, comprising a duct adapted to receive said residue liquid, a depending spray chamber connected to an end of said duct, said spray chamber having a downwardly convergent frustoconical bottom wall provided with a central depending outlet conduit, an annular spray conduit mounted in the top portion of said spray chamber and being substantially coaxial with said bottom wall, said spray conduit being formed with downwardly and inwardly inclined bottom spray apertures directed toward said frustoconical bottom wall, a source of water under pressure connected to said annular spray conduit, a sealed receiving tank, and conduit means connecting said central depending outlet conduit to said receiving tank.

2. The liquid treatment apparatus of claim 1, and wherein said duct is substantially horizontally elongated and is provided with means to convey the residue liquid into one end of the duct, the spray chamber being connected to the opposite end of the duct.

3. The liquid treatment apparatus of claim 2, and wherein said bottom spray apertures are distributed around the bottom periphery of said annular spray conduit and are convergently inclined inwardly at an angle of approximately 5° to the vertical.

4. The liquid treatment apparatus of claim 3, and wherein the conduit means connecting said central outlet conduit to the receiving tank includes a second depending spray chamber below and axially aligned with the first-named spray chamber and of greater height than the first-named spray chamber and having a frustoconical bottom wall of steeper slope than the frustoconical bottom wall of the first-named spray chamber, a second annular spray conduit mounted in the top portion of said second spray chamber substantially coaxially with its bottom wall, and a source of water under pressure connected to said second annular spray conduit, said second spray conduit having circumferentially distributed bottom spray apertures convergently inclined downwardly and inwardly at an angle less than 5° to the vertical.

5. The liquid treatment apparatus of claim 4, and wherein the bottom spray apertures of said second annular conduit are inclined convergently downwardly and inwardly at an angle of approximately 4° to the vertical.

6. The liquid treatment apparatus of claim 5, and wherein the sealed receiving tank has a bottom wall sloping downwardly and away from the connection of said conduit means to receiving tank, whereby to define a sludge-collecting region in the deeper portion of said receiving tank.

7. The liquid treatment apparatus of claim 6, and a drain conduit connected to said receiving tank at said sludge-collecting region.

8. The liquid treatment apparatus of claim 7, and an overflow conduit connected to the upper portion of said receiving tank.

9. The liquid treatment apparatus of claim 8, and support means on opposite walls of said receiving tank between the level of said overflow conduit and said drain conduit, and removable flat crates on said support means covering substantially the entire horizontal cross-sectional area of the receiving tank, said flat crates being substantially filled with filter material.

10. The liquid treatment apparatus of claim 9, and wherein the filter material in each flat crate comprises a bottom layer of steel mesh, a second layer of jute bag material overlying said bottom layer, and a mass of crushed gravel overlying said second layer and substantially filling the flat crate.